Aug. 22, 1967  J. C. CLARK  3,337,071
SELECTIVE CONTROLLER FOR HYDRAULIC ACTUATORS
Filed Jan. 3, 1966  5 Sheets-Sheet 1

INVENTOR.
JOSEPH C. CLARK
BY
Lloyd Snares

INVENTOR.
JOSEPH C. CLARK
BY
Lloyd H. Andres

Aug. 22, 1967 J. C. CLARK 3,337,071
SELECTIVE CONTROLLER FOR HYDRAULIC ACTUATORS
Filed Jan. 3, 1966 5 Sheets-Sheet 4
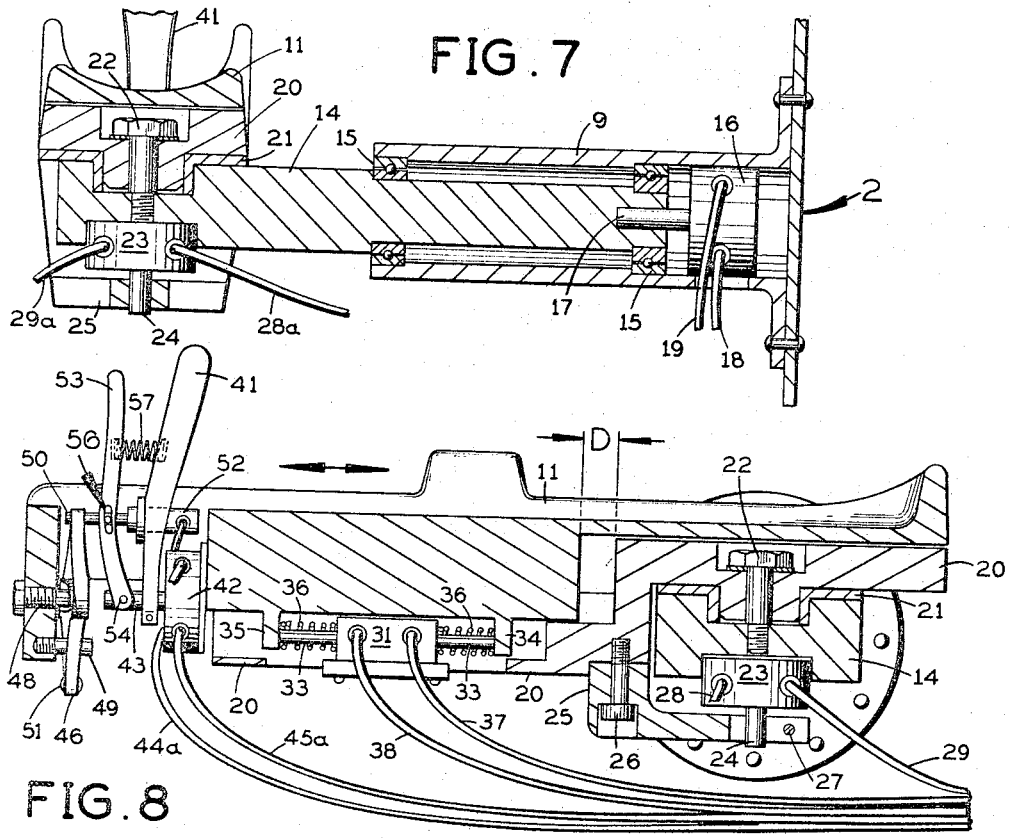
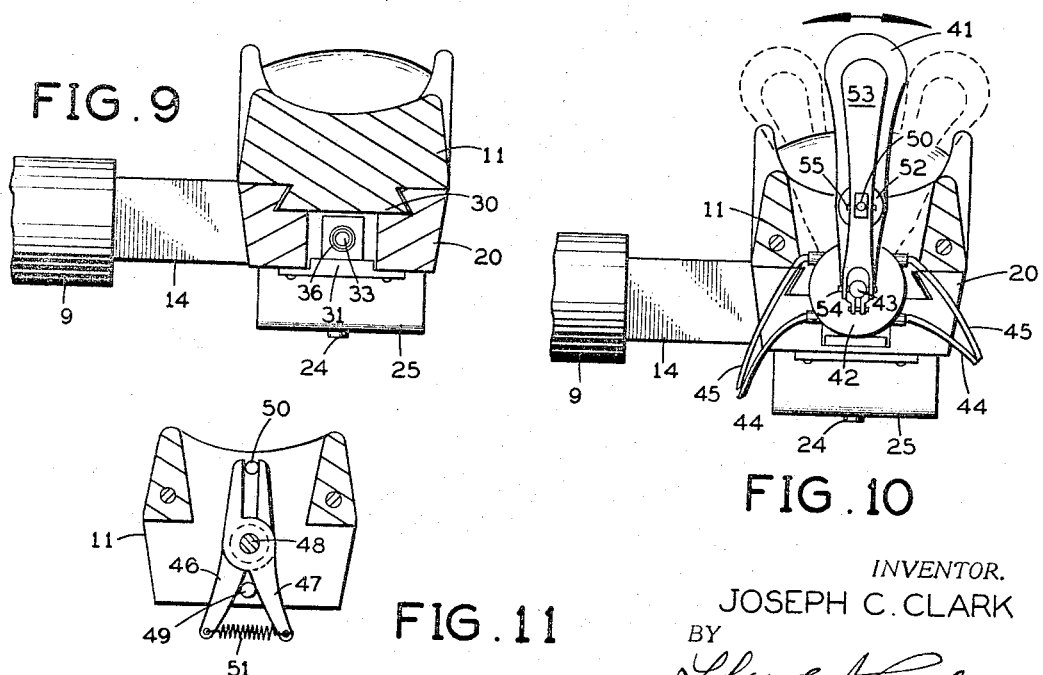
INVENTOR.
JOSEPH C. CLARK
BY
Lloyd Luecker

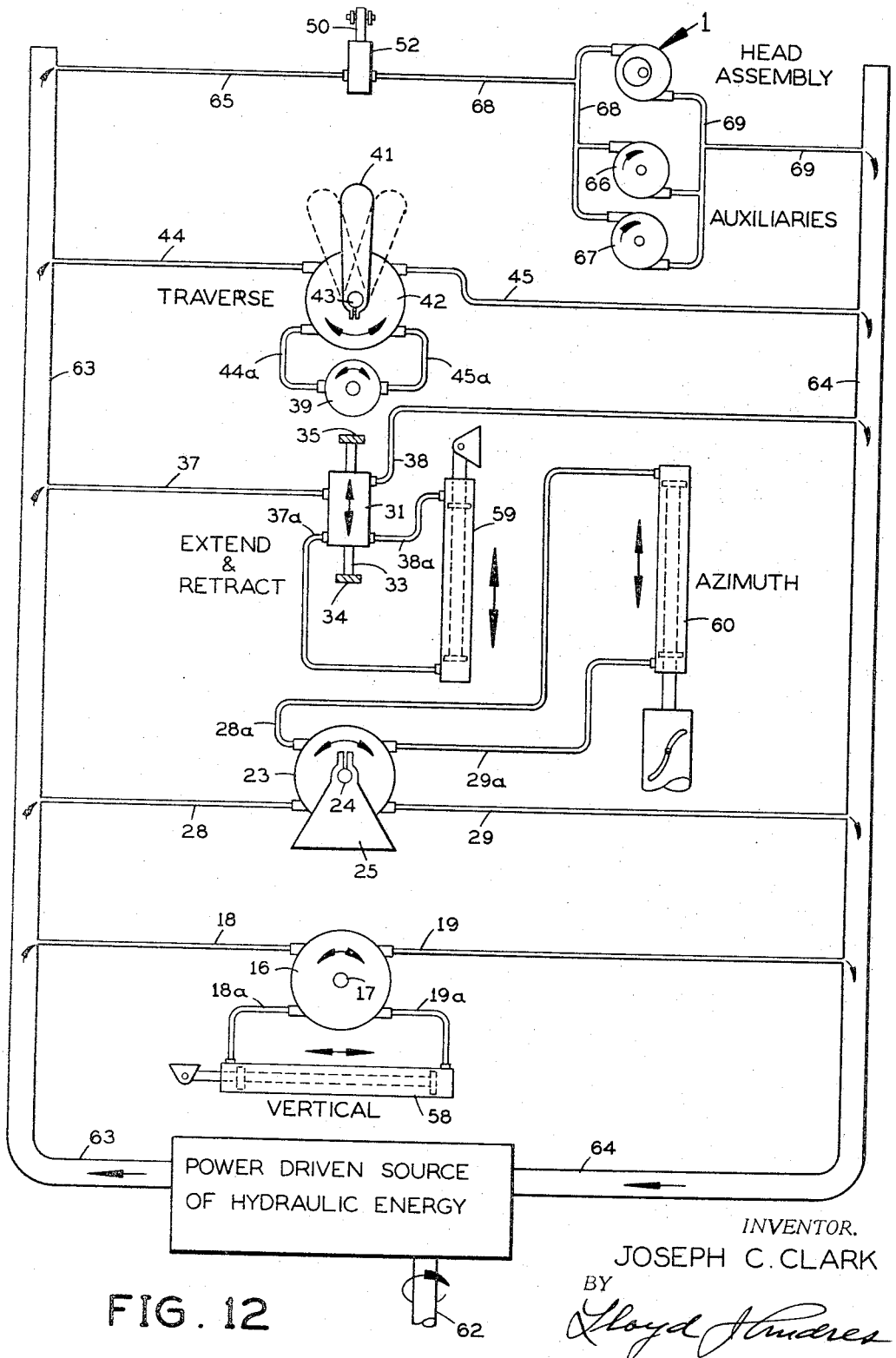

United States Patent Office 3,337,071
Patented Aug. 22, 1967

3,337,071
SELECTIVE CONTROLLER FOR HYDRAULIC ACTUATORS
Joseph C. Clark, 4843 Backacher Lane, Orlando, Fla. 32806
Filed Jan. 3, 1966, Ser. No. 519,401
8 Claims. (Cl. 214—146.5)

ABSTRACT OF THE DISCLOSURE

This invention includes a hydraulic system for actuating a work head, which system includes a plurality of valves which are actuated by a control mechanism. The control mechanism is a movable arm rest associated with the valves so that movement by the operator on the arm rest directs the movements of the work head in such a manner that movement of the arm rest results in the work head being moved in a simulated relationship.

---

This invention relates in general to selective control devices for machines and more particularly to a movable arm rest adapted and constructed to be operated by the forearm of an operator for selectively controlling a plurality of actuators for selective machines.

Prior machines of this general character include hydraulically operated fruit picking machines, backhoes and loading shovels, cranes for fire fighting booms, service lifts better known as "cherry pickers" for servicing elevated public utilities, tree pruning and the like, which machines are presently controlled by relatively large pluralities of separate manually operable levers which selectively energize the various actuators required for moving the outer end or work head of the machines into a selected position.

The rapid and hazard free operation of each of a multitude of control levers requires a high degree of skill resulting from lengthy training and, at best, are often subject to faulty manipulation.

The present invention comprehends an operator's seat, or standing area, on the machine to be operated having an arm rest including a handle projecting therefrom for hand grasping and adapted to energize a plurality of actuators in a manner that will automatically place the outer end or work element of the machine in a selected position corresponding with the "pointing" position of the forearm and the arm rest to the desired selected location, which construction is a principal object of the invention.

A further object of the invention is the provision of a forearm rest related to a machine operator's seat adapted for predetermined movement in both vertical and horizontal directions and connected to a pair of independent fluid actuator control means respectively responsive thereto.

Another object of the invention is the provision of a multi-control means for a machine with a movable work head wherein the operator's seat therefor is provided with a forearm rest movable in a plurality of directions by the forearm of the operator for independently or jointly controlling a like plurality of control means for operating a plurality of actuators for moving the work head into a predetermined selected location colinear with the direction of the operator's forearm.

A further object of the invention is the provision of a machine having a boom with a work head at the outer end thereof and a plurality of actuators for moving the boom and head into any selected position within the range thereof including a movable rest for the operator's forearm independently connected to a plurality of control means connected to said actuators respectively where- by the boom and head will respond to the movement of said arm rest and move to a position colinear therewith when the former is operated.

Another object of the invention is the provision of a movable arm rest for an operator's seat with a plurality of hydraulic valves connected with and responsive to predetermined movements of the arm rest for independently and selectively operating a plurality of hydraulic actuators corresponding to the position of the arm rest.

These and other objects and advantages in one embodiment of the invention are shown and described in the following specification and drawings, in which:

FIG. 7 is a cross sectional end view taken through section line 7—7, FIG. 4.

FIG. 8 is a cross sectional side view taken through section line 8—8, FIG. 4.

FIG. 9 is a cross sectional end view taken through section line 9—9, FIG. 5.

FIG. 10 is a cross sectional end view taken through section line 10—10, FIG. 4.

FIG. 11 is a cross sectional end view taken through section line 11—11, FIG. 5.

FIG. 12 is a schematic circuit diagram of the hydraulic system for the controller.

Figures 1, 2:
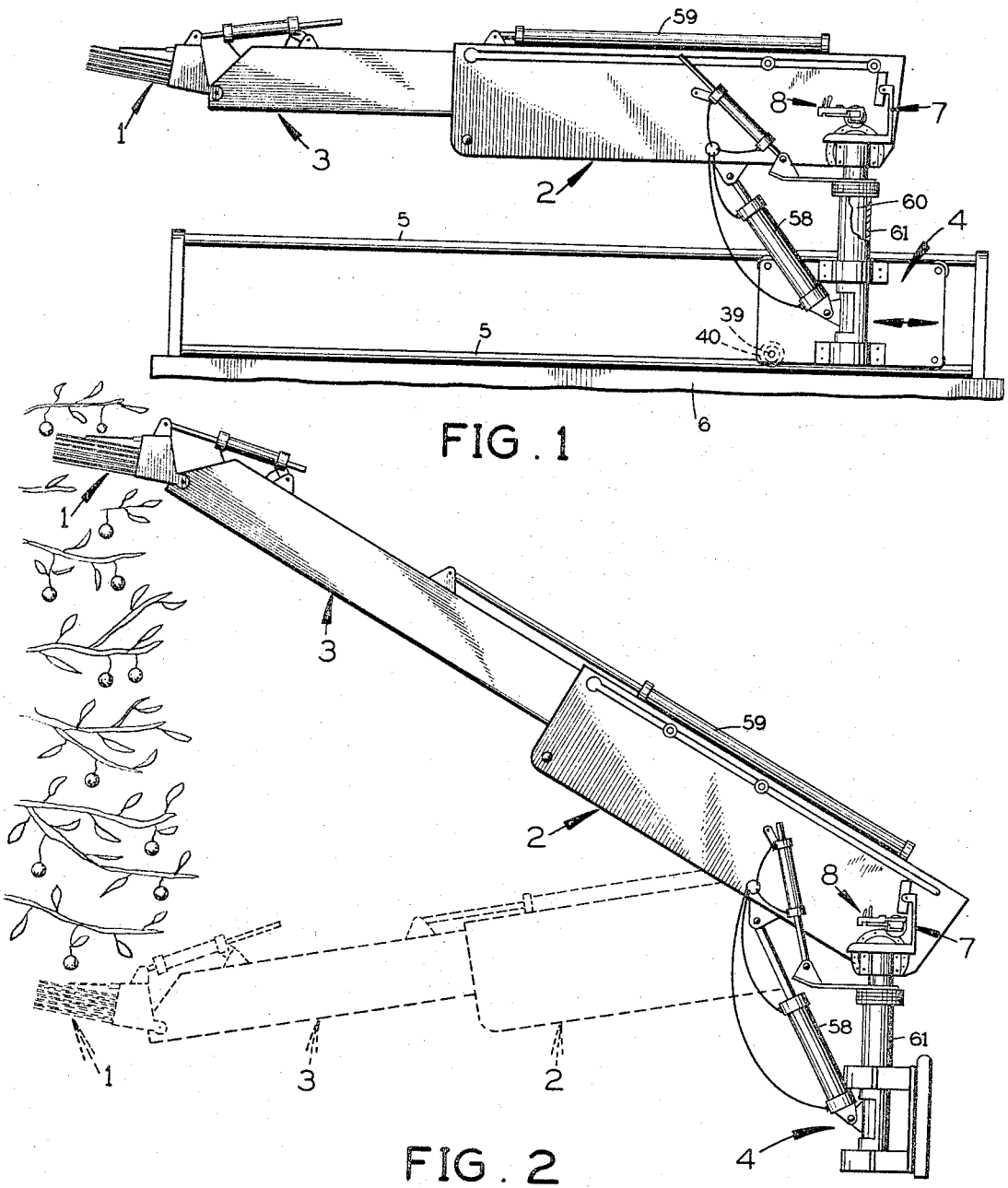
FIG. 1 is a side elevation of a boom means constructed and adapted for universal movement including track means for traverse thereof in reduced scale.
FIG. 2 illustrates the vertical and longitudinal movement of the boom means in FIG. 1.
Figure 3:
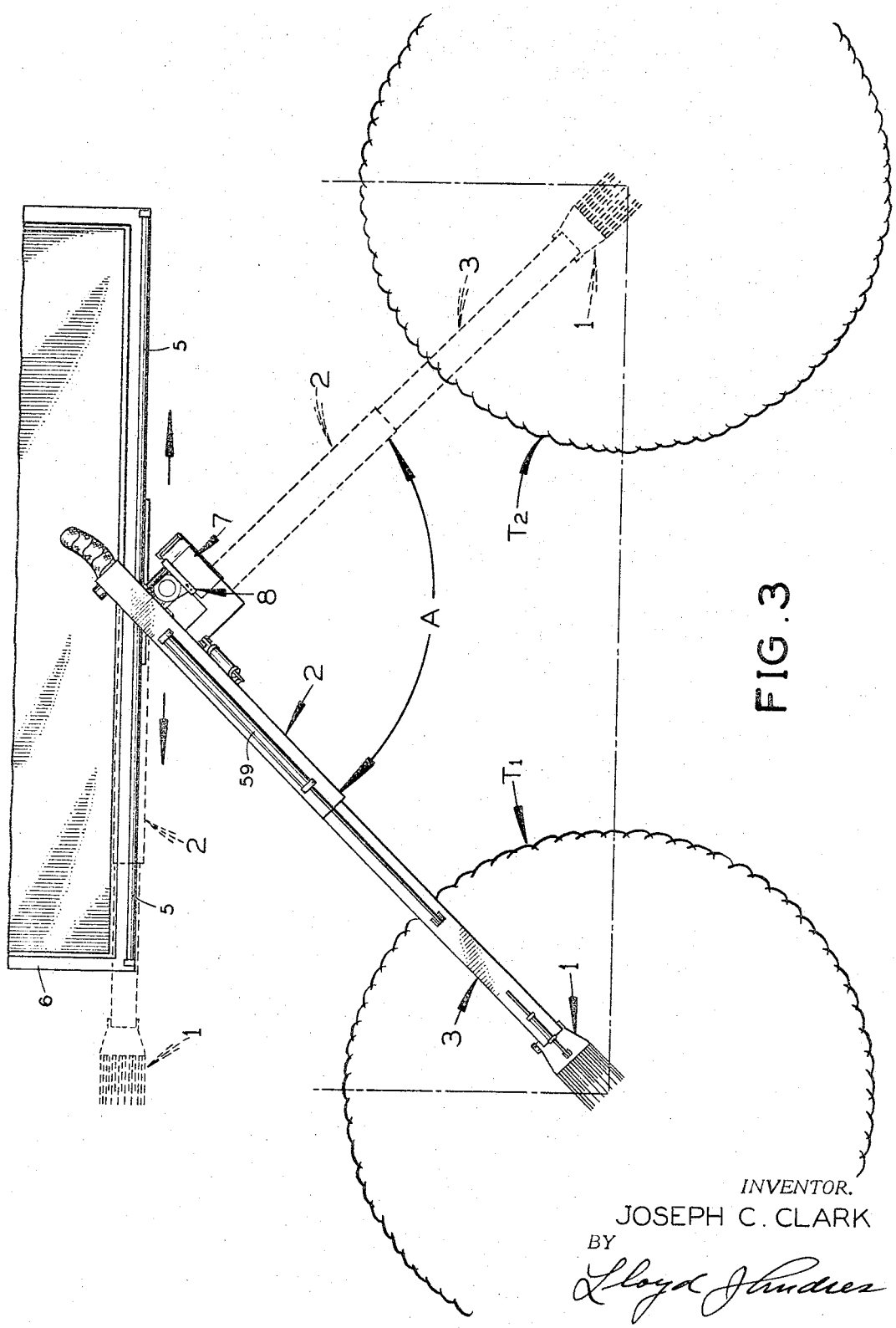
FIG. 3 illustrates the azimuthal movement of the boom means shown in FIG. 1.

FIGS. 1, 2, and 3 illustrate a fruit picking machine which is typical of many multi-movement machines or devices to which the present selective fluid control means is particularly suited.

Reference is had to applicant's pending patent application, Ser. No. 503,108, filed Oct. 23, 1965.

Referring to FIGS. 1 and 2, the picking head assembly 1 is moved into selected positions for picking fruit from a tree having a hydraulically actuated boom assembly 2 having an extension assembly 3 thereon and pivoted on a carriage assembly 4, which is adapted to move in a horizontal direction, shown by arrow, to any selected position within the limits of the rails 5 supported on base 6.

FIG. 2 illustrates in full and dotted lines the vertical movement of the boom assembly 2 and the extension movement of the extension member 3 for any selected position within the limits of the extension member and the angle of movement of the boom 2.

An operator's chair assembly 7 is secured to the boom support for azimuthal movement only and has a selectively movable arm rest assembly 8 conveniently positioned on the boom for conventional operation by the forearm and hand of an operator seated in the chair.

FIG. 3 shows by full and dotted lines the normal azimuthal movement of the boom assembly 2 and the picking head assembly 1 for movement to any selected picking position within any portion A of a total angle of 180 degrees for picking fruit from a portion of the two trees T. This view also illustrates the traverse movement of the entire boom assembly on rails 5, as shown by arrows. The rest or transport position of the boom and picking head assembly is shown in dotted lines parallel the rails 5.

Figures 4, 5, 6:
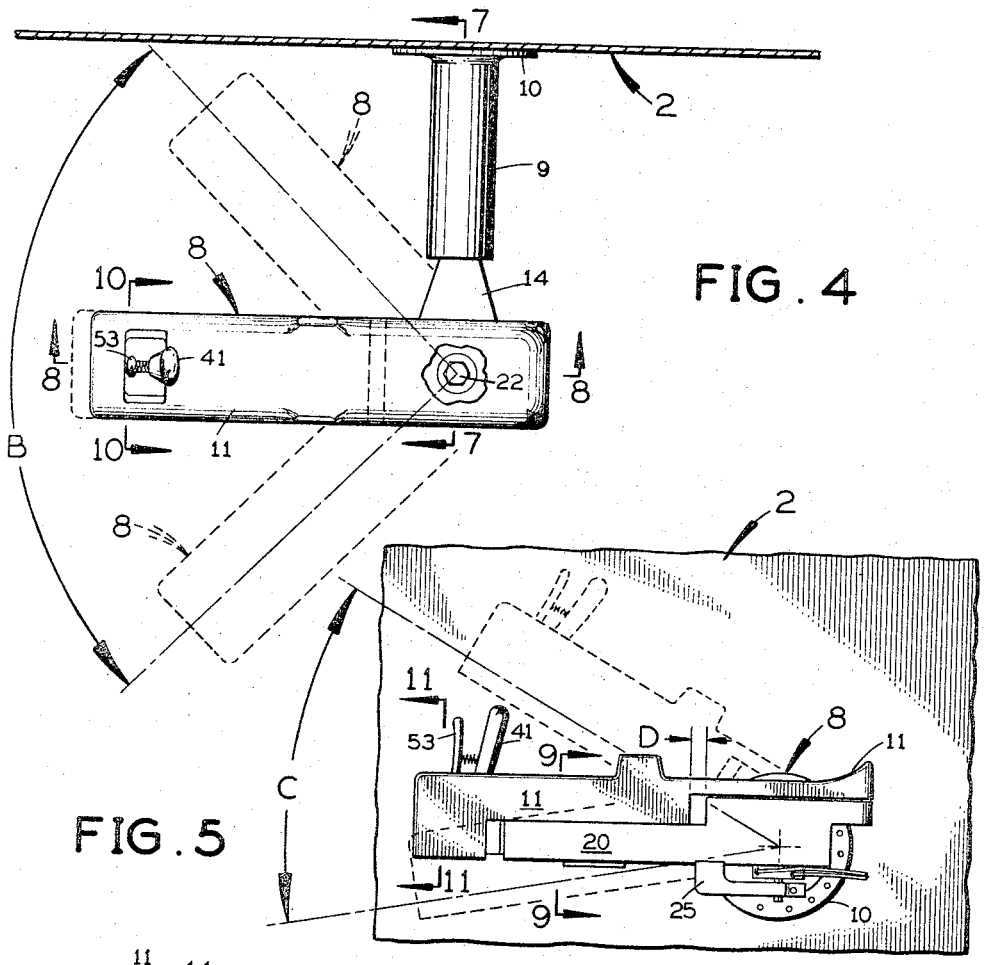
FIG. 4 is a plan view of the arm rest assembly for controlling the boom means shown in FIG. 1, in reduced scale.
FIG. 5 is a side elevation of the forearm rest shown in FIG. 4.
FIG. 6 is a bottom plan view of the arm rest shown in FIG. 4.

FIG. 4 is a top view of the forearm rest assembly 8 which is movably secured to boom assembly 2 by a retaining flange 10 secured to the side of boom assembly 2, by well known means.

The arm rest assembly 8, to be hereinafter described in detail, is provided with a channeled or contoured arm rest 11 for retaining the forearm of the operator seated in chair assembly 7 with his hand positioned for holding control lever 41 and grasping lever 53.

In the machine illustrated and many like embodiments, the pointing of the forearm when positioned on arm rest 11 will activate mechanism and move a work head of the machine to a position co-linear with the alignment of the arm rest.

A main arm support member 14 is journalled for rotation in retainer 9 secured to boom assembly 2 by a pair of ball bearings 15—15, as shown in FIG. 7. The oscillation of this support about the axis thereof provides for the vertical angular movement of the arm rest 11 secured thereto.

A reversible rotary hydraulic valve 16 is secured in retainer 9 and the shaft 17 thereof is coupled to and coaxial with the support member, as shown in FIG. 7. Thus the valve may be moved from a neutral position in opposite directions for reversing the hydraulic operation thereof through two pairs of conduits 18 and 19.

A slide rest 20 is pivotally secured to azimuthal oscillation on the outer end of support 14 by a bearing member 21 and shoulder screw 22. A second reversible hydraulic valve 23 is secured to the lower side of the outer end of support 14 coaxial with shoulder screw 22 with the control shaft 24 thereof clamped for coaxial rotation with slide rest by a bracket 25 retained to slide rest 20 by screws 26, shown in FIGS. 6 and 8. A clamp screw 27 permits rotational adjustment of the valve shaft 24 coaxial with screw 22 and with respect to the slide rest 20. Thus the valve 23 may be moved from a neutral position in either lateral direction corresponding to the azimuthal position of the arm rest assembly which will activate the hydraulic circuit from neutral to corresponding opposite directions through two pairs of conduits 28 and 29.

Referring to FIGS. 6, 8, and 9, the arm rest 11 is provided with a dovetail slide projection 30 on the lower side thereof adapted for slidable engagement in slide rest 20, as shown in FIG. 9, which provides for predetermined fore and aft movement of arm rest 11 with respect to slide rest 20, through a distance D, shown in FIG. 8. A reversible spool valve 31 has the base of the body thereof secured to the underside of slide rest 20 by screws 32, better shown in FIG. 6. The reciprocating plunger 33 thereof is positioned between projections 34 and 35 integral with arm rest 11, as shown in FIGS. 6 and 8. A pair of centering springs 36 on the opposite end portion of plunger 33 normally serve to self center the arm rest 11 and the valve 31 into a neutral or "off" position. Two pair of conduits 37 and 38 are connected to valve 31 for operating the fore and aft movement of the boom extension assembly 3 and the head assembly 1 when the arm rest is moved in corresponding directions against the restraining action of either spring 36.

The carriage assembly 4, shown in FIG. 1, is reversibly motivated along rails 5 by a hydraulic driving motor 39, not shown in FIG. 1 and shown diagrammatically in FIG. 12, which motor is adapted to rotate one of the wheels 40 on carriage assembly 4 for moving the latter along rails 5. This reversible traverse movement is controlled by tilting lever 41 from a neutral vertical position to predetermined opposite tilted directions which will indicate the desired direction of travel of the carriage assembly. A reversible rotary valve 42 is secured in the outer end portion of arm rest 11, as shown in FIG. 8, and the rotary shaft 43 thereof is adapted to be moved from a neutral position in opposite directions for reversing the hydraulic action of the valve. Two pair of conduits 44 and 45 are connected to valve 42 for the operation thereof.

It is now apparent that the tilting of the lever 41 from a neutral central position in either direction will operate the valve 42 and thus control the direction of movement of the carriage assembly 4. Since it is desirable that the lever 41 be self centering to a neutral or vertical position a device, shown in FIGS. 8 and 11, comprises a pair of levers which are pivotally journaled on a threaded stud 48, as shown, which levers engage in a scissor like manner a stop pin 49 and a valve stem 50 projecting from lever 41. A spring 51 normally urges the levers in their closed position against stop 49 in arm rest 11 and valve stem 50. Thus it is apparent that when the lever 41 is moved laterally in either direction it will self center to its neutral central "off" position when released.

A single action hydraulic spool valve 52 is secured in the body of lever 41, as shown in FIGS. 8 and 10, and the stem 50 thereof is constructed to be operated by the gripping lever 53 which is pivoted on shaft 43 by a pin 54 and a transverse pin 55 through stem 50 is engaged in a slot 56 through lever 53, as shown. A compression spring 57 is positioned in appropriate pockets between levers 41 and 53, as shown in FIG. 8. Thus it is apparent that when the lever 53 is gripped together with lever 41 the spring 57 will be compressed and the stem of valve 52 moved from an "off" to an "on" position.

It is to be noted that in this embodiment and referring to FIGS. 1 and 2, a double acting hydraulic actuator or cylinder 58 is connected between the carriage assembly 4 and boom assembly 2 for raising and lowering the boom to pre-selected positions between limits of a vertical angle, illustrated in FIG. 2.

A double acting hydraulic actuator or cylinder 59 on boom assembly 2 is connected between the main boom member and the extension assembly 3 for moving the latter and the work head 1 to a selected position within the range of fore and aft movement thereof when selectively energized.

A double acting hydraulic actuator or cylinder 60 positioned within pillar 61, shown in FIG. 1, better shown in FIG. 12, is constructed to move the entire boom assembly and work head to a selected azimuthal position within angle shown in FIG. 3 when selectively energized.

The reversible valve 42, shown in FIGS. 8 and 10, when operated in either direction will energize a reversible hydraulic motor for rotating wheel 40 in either direction to move the entire boom assembly into a selected position on rails 5, as previously described.

The single action hydraulic valve 52 operated by shaft 43 is intended to operate auxiliary devices, such as the fruit picking head assembly 1 and a conveyor system, not shown, when energized and any other auxiliary hydraulic device which is responsive to simple "on-off" operation, however this valve can be a reversible type if required for a particular operation.

It is to be understood that the forearm rest may be adapted to operate either or both reciprocating or rotary valves to accomplish the same selective end result. It is to be further noted that commercial hydraulic valves, particularly of the throttle type, include therein spring means for automatic self centering from operated to neutral position.

FIGS. 8 and 11 illustrate two of several well known self centering means for urging reversible valves into neutral positions.

Referring to FIG. 12, the hydraulic circuit diagram illustrates the conduit connections between the selective control mechanism and the hydraulic actuators shown.

FIG. 12 illustrates a source of hydraulic energy which is intended to include a conventional sump, bypass valve, filter and a hydraulic pump driven by shaft 62 and has connected thereto an outlet manifold 63 and an inlet manifold 64. The vertical control valve 16 is connected to manifolds 63 and 64 by conduits 18 and 19 respectively and the vertical hydraulic actuator 58 is connected to valve 16 by conduits 18a and 19a. The azimuthal control valve 23 is connected to manifolds 63 and 64 by conduits 28 and 29 respectively and the valve is connected to the azimuthal actuator 60 by conduits 28a and 29a. The valve 31 is connected to manifolds 63 and 64 by conduits 37 and 38, respectively, and the valve is connected to the extend and retract hydraulic actuator by conduits 37a and 38a. Valve 42 is connected to manifolds 63 and 64 by conduits 44 and 45, respectively, and the valve is connected to hydraulic traverse motor 39 by conduits 44a and 45a. Valve 52 has the inlet thereof connected to manifold 63 by conduit 65 and the outlet thereof connected to the hydraulic actuator in head assembly 1 and other auxiliary actuators 66 and 67 by conduit 68 which actuators have their outlets connected to manifold 64 by conduit 69.

In operation and referring to FIGS. 4 and 5 in connection with FIGS. 1, 2, and 3, and assuming that an operator has his forearm on arm rest 11 and his hand around levers 41 and 53 then to move the entire boom assembly to a desired traverse position the lever 41 is tilted by wrist movement to the desired direction until the carriage has moved the boom assembly to the desired position at which time the lever 41 is permitted to return to its central neutral position. The boom assembly in FIG. 3 is substantially centrally positioned on rails 5 for picking fruit from a pair of spaced trees $T_1$-$T_2$.

In order to position the boom to the azimuthal position shown in solid lines in FIG. 3, for picking fruit from tree $T_1$, the arm rest is moved counter-clockwise through a portion of azimuthal angle B, shown in FIG. 4, which will result in the boom assuming a desired azimuthal position for picking the fruit from tree $T_2$ dependent upon the predetermined range of movement of the valve 23.

In order to move the boom assembly in a selected vertical position the arm rest 11 is vertically tilted to a predetermined position within angle C, shown in FIG. 5, which will result in the boom moving and automatically stopping the head assembly 1 in a predetermined vertical position.

It is also to be understood that when the arm rest is moved to a particular selected vertical and azimuthal position the boom assembly will come to rest in a predetermined position corresponding to the direction the arm rest is moved for the reason that the bodies of the valves 16 and 23 travel with the boom assembly while the arm rest is held in a pre-selected direction by the operator. Therefore when the boom assembly is aligned accordingly the valves will have moved into their respective neutral positions. Thus the arm rest serves in a sense as a pointer for selecting a desired position for the work head.

Any selected fore and aft position within the range of the auxiliary boom assembly 2 is accomplished by relatively short forward and aft movements of the arm rest 11 on slide rest 20.

When the working head of the boom assembly is moved to any selected position within the range of the boom assembly then the head and other auxiliaries, such as conveyors, may be operated by squeezing the lever 53 toward the handle 41 when the latter is grasped by the hand, thus operating valve 52.

It is to be understood that the arm rest for operating the selected machine may be operated from a standing position where the use of an operator's chair is not desired.

It is also now apparent that pneumatic or steam operated actuators and control valves therefor may be substituted for the aforesaid hydraulic devices with equivalent results.

It is also to be understood that certain modifications in the construction, utilizing the features above described, are intended to come within the scope of the appended claims.

Having described my invention, I claim:

1. A control mechanism and a hydraulic system for a machine including a work head movable to selected positions responsive to the actuation of said control mechanism through said hydraulic system, said control mechanism comprising a movable arm rest, a plurality of pressure type control means in said hydraulic system operatively associated with said arm rest for directing the movements of said work head, said control means including a reversible rotary valve mounted adjacent said arm rest, actuating means in said hydraulic system for moving said work head in a substantially vertical direction responsive to vertical movements of said arm rest, said arm rest being pivotable about a substantially vertical control shaft, a second reversible valve mounted adjacent said control shaft, a second actuating means in said hydraulic circuit for moving said work head laterally responsive to like movements of said arm rest, a portion of said arm rest being slidable in a longitudinal direction relative to the remainder of said arm rest, and a third reversible hydraulic valve affixed below said portion, a reciprocating plunger mounted on said portion to actuate said third valve, said hydraulic system connected to piston means for reciprocating said work head responsive to like movements of said slidable portion of said arm rest.

2. The invention of claim 1, wherein said piston means is connected to a telescoping section of a boom which supports said work head whereby said telescoping section is extended and withdrawn as said slidable portion is displaced.

3. The invention of claim 1, wherein said machine is supported on a movable carriage and lever means is associated with further valve means in said hydraulic circuit, a motor in said circuit for moving said carriage responsive to the movements of said lever means.

4. The invention of claim 3, wherein said lever means includes a gripping lever and a tiltable lever, spring means associated with said levers for urging said tiltable lever in neutral position.

5. The invention of claim 3, wherein said carriage is mounted on wheels and said wheels are supported to traverse rails, a motor being operatively connected to turn said wheels responsive to the movements of said tiltable lever.

6. The invention of claim 1, wherein said reciprocating plunger is spring biased to neutral position.

7. The invention of claim 6, wherein said plunger includes an exposed portion on either side of said valve and said spring means is associated with said exposed portions.

8. The invention of claim 1, wherein one end of said movable arm rest is journalled in a substantially horizontal retaining member on said machine and said rotary valve is mounted in said retaining member whereby the rotation of said arm rest actuates said valve.

References Cited
UNITED STATES PATENTS

| | | | |
|---|---|---|---|
| 2,536,724 | 1/1951 | Clay | 214—135 |
| 2,858,947 | 11/1958 | Chapman | 214—1 |
| 2,861,699 | 11/1958 | Youmans | 214—1 |
| 2,912,131 | 11/1959 | Jung et al. | 214—131 |
| 3,087,636 | 4/1963 | Weaver | 214—141 |
| 3,144,146 | 8/1964 | Strickland | 214—135 |

HUGO O. SCHULZ, *Primary Examiner.*